(No Model.)
J. ARMSTRONG.
PIPE COUPLING.
No. 376,130. Patented Jan. 10, 1888.
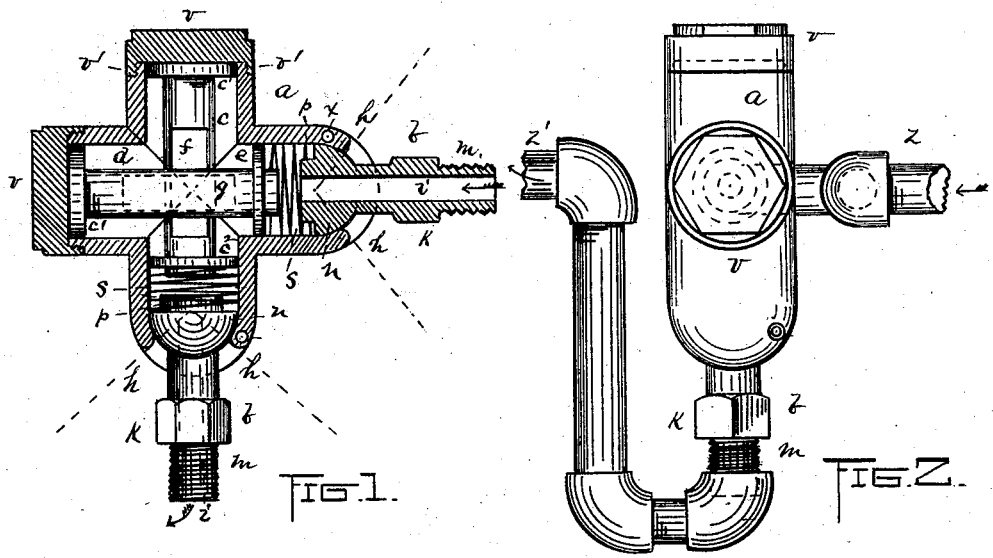
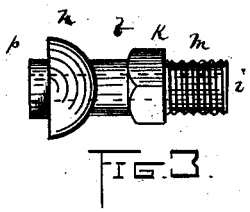
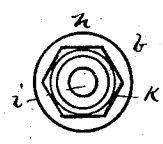
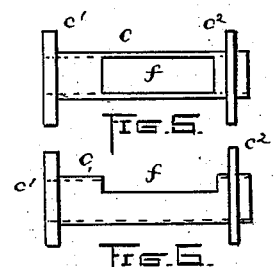
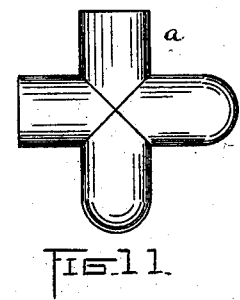
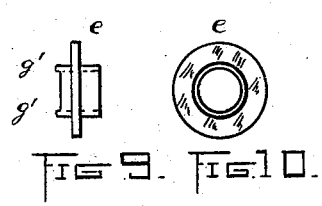
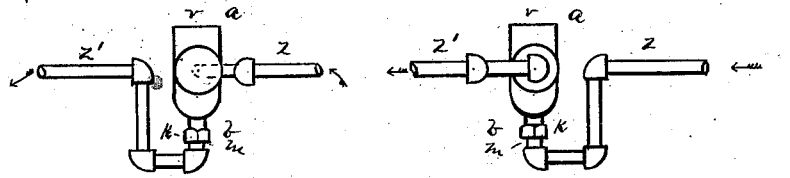
WITNESSES:
Pierrepont Bartow
Wm. W. Ames
INVENTOR.
James Armstrong
BY
Baldwin Hopkins & Peyton
ATTORNEYS.

UNITED STATES PATENT OFFICE.

JAMES ARMSTRONG, OF BRIDGEWATER, NEW YORK.

PIPE-COUPLING.

SPECIFICATION forming part of Letters Patent No. 376,130, dated January 10, 1888.

Application filed August 18, 1887. Serial No. 247,300. (No model.)

*To all whom it may concern:*

Be it known that I, JAMES ARMSTRONG, of Bridgewater, in the county of Oneida and State of New York, have invented certain new and useful Improvements in Pipe-Couplings, of which the following is a specification, reference being had to the accompanying drawings, in which—

Figure 1 is a central section of my improved coupling device. Fig. 2 is a side view. Fig. 3 is a side view of the hollow coupling-stem and head detached. Fig. 4 is an end view of the same. Figs. 5 and 6 are different side views of the hollow stem and plunger detached. Fig. 7 is an end view of the same. Fig. 8 shows the stem without its removable head. Figs. 9 and 10 are different views of the removable head of the plunger-stem. Fig. 11 shows the shell of the coupling; and Figs. 12 and 13 are similar to Fig. 2, and merely show the outsides of two couplings in the position they would assume in practical use.

The object of my invention is to provide a convenient coupling for steam and water pipes, which will be adapted to prevent leakage under varying conditions of expansion and contraction, which will render exact measurements for sizes of parts unnecessary, and which will accommodate itself to different situations in screwing pipes together whether they are shorter or longer, or whether they are in line or not, the coupling-head and its stem being rotary and adapted to be turned in any direction like a rod connected to another part by a ball-and-socket joint.

Referring to the letters upon the drawings, $a$ indicates the outside or coupling casing.

$b$ indicates the head and stem all in one tubular or hollow piece.

$c$ indicates hollow stems of plunger-heads $c'$ $c^2$.

$f$ indicates the opening or cut-away parts of these hollow stems, which are at right angles, so that any fluid entering the shell may pass through freely.

$d$ in Fig. 8 indicates one of the hollow plunger-stems, the head $e$, as shown in Figs. 9 and 10, being removed.

I use the terms "plunger" and "plunger-stems" because the parts resemble ordinary plungers and their stems, and they serve to follow up or compress the springs, and when in place act as spring-seats or spring-supports, as will be seen farther on.

$k$ indicates a square, hexagonal, or angular part of the stem adapted for the application of a wrench to turn it.

$m$ indicates the screw-thread on the hollow stem.

$n$ indicates the coupling-head, which is semi-globular in form.

$s$ $s$ indicate springs between the heads $e$ and $n$.

$v$ indicates the screw caps of the casing, provided with threads $v'$. The heads $e$ and their stems, the springs $s$ $s$, and the heads $n$ and their stems are inserted in place through the openings in the shell, which are afterward closed by screwing the caps $v$ down tightly.

$z$ $z'$ indicate the piping.

$i$ indicates the opening in the stem and head $e$.

$p$ indicates a shoulder that seats one end of the coil-spring $s$. These springs are pressed down by the plungers, so as to bear against the heads $n$ and hold them to their seats, and yet permit them to rotate or to be bent or tilted. The caps $v$ are screwed down, so as to press the plungers against the springs and hold them in place.

What I claim to be new is—

The combination, with a shell, of the screw-caps $v$, the plungers with their hollow stems at right angles and open, as shown, the springs $s$ $s$, and the hollow coupling-heads and stems, substantially as set forth.

In testimony whereof I have hereunto subscribed my name.

JAMES ARMSTRONG.

Witnesses:
E. LOUISE KNIGHT,
HIRAM D. BURDICK.